June 25, 1968   J. VAN TILBURG   3,390,403
ORIENTED PILE STRUCTURE

Filed May 1, 1967

June 25, 1968     J. VAN TILBURG     3,390,403
ORIENTED PILE STRUCTURE

Filed May 1, 1967     4 Sheets-Sheet 3

INVENTOR.
JAN VAN TILBURG
BY
*Marshall & Yeasting*

United States Patent Office 3,390,403
Patented June 25, 1968

3,390,403
ORIENTED PILE STRUCTURE
Jan van Tilburg, Lyceumstraat 74,
Alkmaar, Netherlands
Continuation-in-part of applications Ser. No. 333,535,
Dec. 26, 1963, Ser. No. 401,580, Oct. 5, 1964, and
Ser. No. 460,889, June 1, 1965. This application
May 1, 1967, Ser. No. 638,691
Claims priority, application Netherlands, Dec. 27, 1962,
287,191; Feb. 20, 1963, 289,206; Aug. 19, 1963,
296,831; Sept. 9, 1963, 297,639; Oct. 7, 1963, 298,891;
June 2, 1964, 6406208
15 Claims. (Cl. 161—67)

ABSTRACT OF THE DISCLOSURE

A novel flexible sheet material having a pile surface in which the individual pile structures of the pile surface are of an oriented thermoplastic polymer and a novel process for forming this pile-surfaced sheet material by introducing a thermoplastic polymer layer into a deforming device, and drawing the polymer layer from the deforming device by applying sufficient force to form said oriented pile structures.

Cross-reference to related applications

This is a continuation-in-part of applications Ser. No. 333,535, filed Dec. 26, 1963, Ser. No. 401,580, filed Oct. 5, 1964, and Ser. No. 460,889, filed June 1, 1965.

Background of the invention

This invention relates to a flexible sheet material having a pile surface and to a process for making the same.

In general, pile-surfaced sheet materials have been prepared by embossing techniques as illustrated in Takai, U.S. Patent 3,141,051, issued July 14, 1964; or in Wisotzky, U.S. Patent 3,098,262, issued July 23, 1963. However, embossing techniques to produce a pile-surfaced sheet result in a product which is a mirror image of the specific embossing device. These embossing techniques do not produce a product that has a pile structure which is highly oriented and therefore durable, wear and scuff resistant. Another method for producing pile-surfaced sheet materials, as illustrated in Lemelson, U.S. Patent 3,275,487, issued Sept. 27, 1966, is to embed filaments of a textile material in a molten thermosplastic layer. But this process of embedding filaments in a thermoplastic layer is slow and cumbersome and generally does not produce a uniform product of high quality. There are many well known conventional methods in the textile industry for forming a pile-surfaced material, for example, a multiplicity of filaments are needled into a fibrous substrate and are then cut to form the pile surface. Conventional textile methods do not produce a product which is comparable in durability and aesthetics to the novel product of this invention. An elongated plastic product, such as a synthetic fibre or a plastic pile, manufactured from a plastic material consisting of chain-like macro-molecules, has a great strength only if it has been subjected to a stretching treatment resulting in molecular orientation. The novel product produced by the novel process of this invention is of high and uniform quality and has excellent durability since the filaments forming the pile-surfaced layer are highly oriented and are firmly attached to the substrate but do not penetrate into the substrate. The process for producing this novel product is quite flexible since products can be produced having a wide variety of pile surfaces by simply varying the process conditions, for example, the speed or the pressure or the temperature at which the process is run.

Summary of the invention

The novel process of this invention for forming a flexible sheet material having a pile surface layer comprises the following steps:

(1) Introducing a thermoplastic polymer layer at least partially into a deforming device having a multiplicity of small openings, each individual opening having a neck restriction which restricts the flow of polymer into the cavity beyond the neck restriction;

(2) Maintaining the thermoplastic polymer at a temperature below the softening point of the polymer; and (3) Drawing the thermoplastic polymer layer from the deforming device by applying sufficient force to uniaxially orient the polymer as it is being removed from the deforming device and being shaped into a pile structure.

The degree of orientation of the thermoplastic polymer of the pile structure is such that the pile shrinks about 50–90% of its original length when the pile structure is reheated to the Vicat softening temperature of the polymer. Preferably, the thermoplastic polymer of the pile structure is oriented to such a degree that it will shrink 80–90% of its length when reheated to the Vicat softening temperature.

Description of the preferred embodiments

Figure 1:
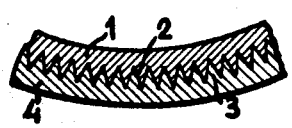
FIGURE 1 is a diagram of the principle of the embossing process of the prior art.

A part of the cross-section of the periphery of a cylinder is, in FIGURE 1, indicated with the numeral 1. This periphery is provided with crater like tapered depressions 2. An originally flat plastic sheet is pressed into these depressions, resulting in a plastic deformation of its surface and in the creation of the tapered piles 3; the opposite surface of the sheet 4 remains flat. The product obtained is easily removable from the cylinder, because the piles are tapered and therefore self-loosening. This thus is the known embossing technique.

Figure 2:
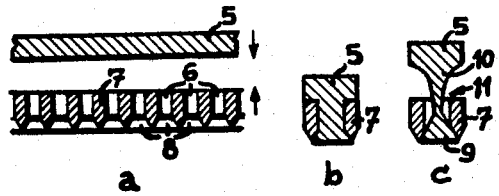
FIGURE 2 is a diagram of the principle of the process according to the invention.

In FIGURE 2a, the plastic sheet or foil 5 is to be pressed into a flexible metal sheet 7 provided with many small cavities 6. The cavities 6 are of a cylindrical shape at the side facing sheet 5, but they are slightly conical at the opposite side 8. The pressing of the sheet 5 into the sheet 7 results in that the cavities 6–8 become filled with the plastic material (FIGURE 2b, showing a small part of FIGURE 2a). Subsequently, i.e. when the sheets 7 and 5 are pulled apart, a situation arises as sketched in FIGURE 2c, which means that the material situated in the cavities 6–8 is stretched, because these cavities, in contrast with the construction sketched in FIGURE 1, are of non-self-loosening shape.

The pulling apart of the sheets 5 and 7 either may be halted as soon as a situation as sketched in FIGURE 2c is attained, or may be continued until the heads 9 have been stretched so much that they are able to pass through the cavities 6; in the former case the formed piles 10 have to be cut off at 11.

Figure 3:
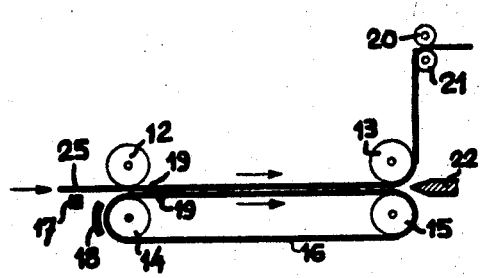
FIGURE 3 is a diagram of one mode of execution of the process according to the invention.

In FIGURE 3, the plastic sheet or foil 25 is transported by means of the rolls 12 and 13. A belt-shaped deformation device 16, provided with non-self-loosening cavities, is guided by means of the rolls (cylinders) 14 and 15 (roll 15 may e.g. be driven by a motor). The plastic sheet, before it touches the deformation device 16, is flat on both sides. Between the rolls 12 and 14 (these rolls are made to approach each other, e.g. by means of springs) the belt 16 is pressed into the surface of the plastic sheet facing the belt, in the manner described above (FIGURE 2). This pressing will be the more easy, the higher the temperature of the plastic sheet. If heating of the plastic sheet is to be applied, this may be done in several ways, e.g. with the aid of an infrared radiator 17 heating the lower side of the plastic sheet, or with the aid of an infrared radiator 18, heating the (in general, metal) deformation device 16. In those cases in which a mono- or bi-axially stretched plastic sheet or foil is started with, one generally will use little if any heating, if a destruction of the molecular orientation is to be prevented; a heating localized by cooling (e.g. with the aid of cold air) at 19, i.e. immediately after the first contact, of both the plastic sheet and the deformation device, is very efficient to maintain the molecular orientation.

The combination of plastic sheet 25+deformation device 16, after passing the rolls 13–15, is subsequently pulled apart by means of the rolls 20 and 21. This pulling apart will be the more easy, the higher the temperature of the plastic elements to be drawn out. If heating is to be applied, this may be done in the same way as described with reference to the entry side of the apparatus. In this connection, it is pointed out, that the most desirable stretching temperature is dependent on the nature of the plastic material used; these temperatures are well known from the literature covering the stretching or synthetic fibers.

If the pile side is heated during the pulling apart, the other side of the plastic sheet may be cooled, if desired. In order to maintain the molecular orientation and/or to considerably increase the speed of production, a cooling of the non-pile side of the plastic sheet is highly advantageous. As mentioned before (FIGURE 2), the heads of the piles may, if desired, to cut off. To this end, a knife 22 is shown in FIGURE 3, although many other cutting devices may be used instead: heated wires, band knife saws, etc.

Figure 4:
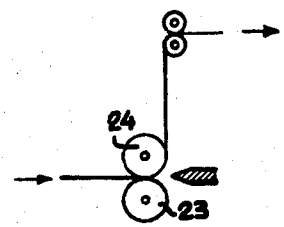
FIGURE 4 is a diagram of a second mode of execution of the process according to the invention.

In FIGURE 4, the function of the belt 16 (FIGURE 3) has been taken over by the roll 23, the surface of which is provided with cavities of a non-self-loosening shape; the functions of the rolls 12 and 13 (FIGURE 3) have been taken over by the roll 24.

Figure 5:
FIGURE 5 shows some cavities of a non-self-loosening shape.
Figure 5:
Figure 5:
Figure 5:

Some modes of execution of cavities of a non-self-loosening shape are sketched in FIGURE 5; FIGURE 5a does not need to be further elucidated; FIGURE 5b is the opposite of FIGURE 1, the piles being pulled out in the direction indicated by the arrows; FIGURE 5c indicates a porous material; FIGURE 5d is a cross-section of woven wire gauze.

Figure 6:
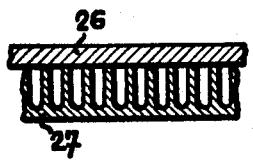
FIGURE 6 shows a sandwich-construction according to the invention.

A sheet provided with piles on one side may be covered on that side with another sheet not provided with piles; in this way, a sandwich-construction is obtained, as sketched in FIGURE 6; the parts 26 and 27 may be attached to each other e.g. by means of heat, or by means of an adhesive; some materials, moreover, may be joined according to the flame-method (used in "foam-backing").

The pressing and the pulling apart (not the speed of production) will take place the more slowly and gradually, the greater the diameter of the rolls 12–14, 13–15 and 23–24.

Figure 7:
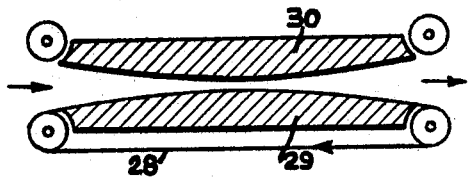
FIGURE 7 shows a slightly modified version of FIGURE 3.

This gradualness may also be promoted in other ways, e.g. by means of a K-shaped or an X-shaped convenyance (an X-shaped conveyance is sketched in FIGURE 7; 28, 29 and 30 are, respectively, a deformation belt, a belt guide and a material guide; the guides may be made adjustable and may be spring-loaded).

Figure 8:
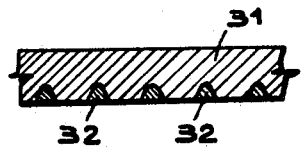
FIGURE 8 shows a section through a belt.

In many ways, other than with the cavities described, a deformation device may, according to the invention, be provided with a multiplicity of local areas of retaining properties, which may be illustrated by the following examples: If e.g. (FIGURE 8) a steel belt 31 is provided with a great number of small depressions 32, which depressions are filled with e.g. polypropylene, bringing this filled steel belt (in cold condition) into contact with an object (e.g. a sheet of polypropylene) the surface of which is softened by heating, will make the heated polypropylene adhere to the cold one, thus resulting in the formation of piles as soon as the deformation device 31 and the object are separated; the material situated in the depressions and that of the sheet may be dissimilar.

Figure 9:
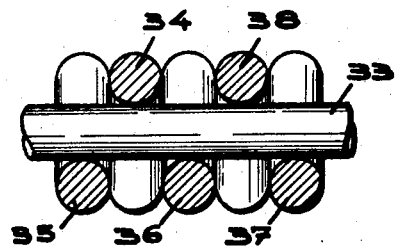
FIGURE 9 shows a section of a modified version of FIGURE 5d.

The woven wire gauge sketched in FIGURE 5d is a wire gauze whose wires, both the wires in length and the wires in width, are "wavy." However, the wire gauze may also be non-wavy in one direction, as diagrammatically shown in FIGURE 9; 33 is one of the non-wavy parallel wires in one direction; 34 to 38 inclusive are wavy wires in the other direction. The wire gauze may be employed with the aid of the apparatus of FIGURE 4.

Figure 10:
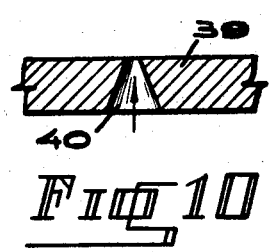
FIGURE 10 shows a section through a cavity.

Cavities which are self-loosening in themselves, may be operated in such a manner that they acquire in fact non-self-loosening properties; this is elucidated with the aid of FIGURE 10; when, in the direction of the arrow, a quantity of material is pressed into the cavity 40 of the deformation device 39 up to the upper side of 39, then that cavity is self-loosening. If however, the pressing is continued (so that e.g. a film is formed on top of 39), then the cavity has become non-self-loosening (pile formation in the direction opposite to that of the arrow).

*Process description*

Figure 13:
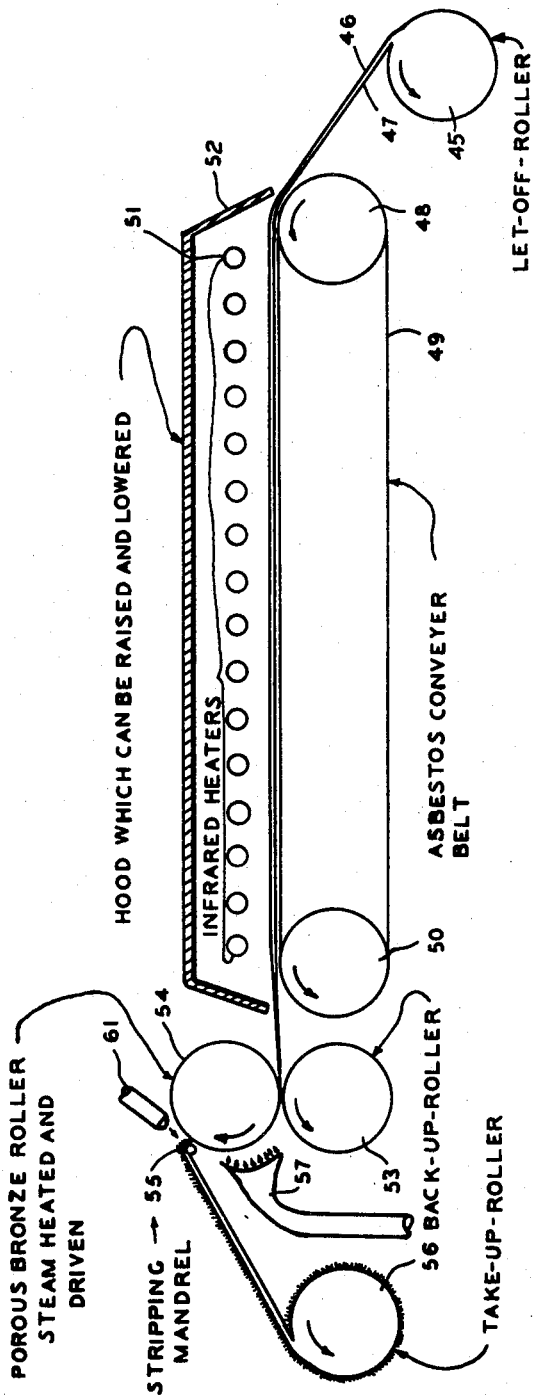
FIGURE 13 illustrates one preferred embodiment of the novel process of this invention.

(A) Preferred process.—In reference to FIGURE 13, a fibrous backing material 47, e.g., a woven cotton cloth, and a sheet of a thermoplastic polymer 46, e.g., a polyethylene sheet about 5 mils thick, are continuously fed from roller 45 at a rapid rate, for example, about 10 feet/minute, onto an asbestos conveyor belt 49 driven by rollers 48 and 50. The composite of fibrous backing material 47 and the thermoplastic polymer sheet 46 is passed into the high temperature zone covered by the hood 52 and having infrared heating elements 51 positioned therein. The high temperature causes the thermoplastic polymer sheet to become molten. The heated composite of the molten thermoplastic polymer sheet 46 and the fibrous backing material 47 is fed into the nip formed by roller 53 and a steam heated porous bronze roller 54. The surface of the roller 54 is of a sintered bronze and has openings, each having a neck restriction at the surface and a larger cavity beneath. Preferably, the porous bronze roller has about 10,000 cavities or openings per square inch. The nip pressure forces the molten thermoplastic polymer into the cavities in the surface of the heated bronze roller 54. A nip pressure of about 20 pounds per lineal inch is used. The polymer flows through the neck restriction and into the larger cavity beneath in which the polymer expands to an area wider than the neck restriction. The composite sheet material now having the thermoplastic polymer film firmly adhered to the fibrous backing because of the heat and pressure of the nip rollers is advanced around the porous bronze roller 54. The sheet material is then cooled by a stream of cool air which is continuously blown from the conduit 57 onto the sheet. This cooling device lowers the temperature of the thermoplastic polymer to at least the Vicat softening temperature of the polymer. The sheet material is then stripped off the porous bronze roller 54 by the stripping mandrel 55. As the polymer is being stripped from the porous bronze roller, pile structures are formed. To insure that the pile structures are sufficiently cooled so that shrinkage does not occur and the polymer does not remain tacky, a stream of cool air is continuously blown from conduit 61 into the nip formed by the stripping mandrel 55 and the porous bronze roller 54. The neck restrictions of the openings in the bronze roller cause the polymer as it is being stripped from the bronze roller to elongate and orient and to be shaped into a pile structure. The composite sheet material having a pile surface layer is then wound on take-up roller 56.

(B) Temperature.—In general, the temperature used in the process of this invention must be sufficient to melt the polymer so the polymer can flow into the porous deformation device. For most thermoplastic materials, the temperature should not be much higher than the melting temperature of the thermoplastic polymer. Typical temperature ranges for different polymers are from 100° C. to 350° C. After the thermoplastic material has been forced into the deformation device, it is cooled to at least the Vicat softening point of the polymer but not lower than 30 C. The cooling step is required to keep the polymer in the form of a pile structure, that is, elongated and oriented, after removal from the deformation device.

Cooling of the thermoplastic polymer after it has been forced into the deformation device may be accomplished by a variety of methods, for example, a stream of cold air, a chilled roller, or a water spray. The cooling method used is not critical and any method which would bring the temperature of the thermoplastic polymer within the aforementioned range is sufficient.

An alternative to the use of an elevated temperature is to treat the polymer with a solvent and then force the polymer into a deforming device. Solvent is then evaporated from the deforming device and oriented pile structures are formed.

(C) Pressure.—The amount of pressure applied to force a thermoplastic polymer into the deformation device varies from about 1 to about 100 pounds per lineal inch of a pair of rollers and preferably is about 5 to about 25 pounds per lineal inch. Sufficient pressure should be applied to at least partially force the polymer into the porous deformation device. A practical commercial process generally requires that at least some pressure be applied to the polymer layer rather than allowing the polymer to flow into the deformation device. A vacuum may be used instead of applying pressure or in conjunction with pressure on the thermoplastic polymer to increase the rate of flow and degree of penetration of the thermoplastic polymer into the deforming device.

Figure 14:
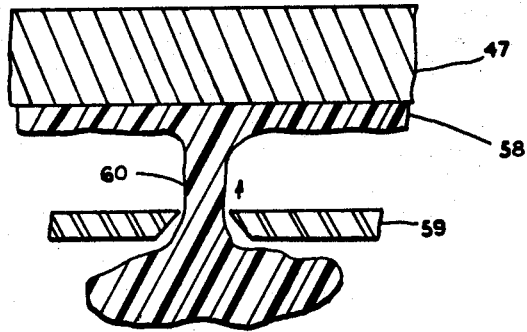
FIGURE 14 illustrates an enlarged cross section of a thermoplastic polymer layer which has been forced through the neck restriction of a plate and is being formed into a filamentary pile structure.

(D) Deformation device.—The primary requirement of the deformation device is that it provide a multiplicity of openings, each having a neck restriction which has a diameter smaller than that of the cavity below. The thermoplastic polymer is forced through the neck restriction and expands within the cavity below. After cooling of the polymer, the polymer is removed and the neck restriction causes the polymer to be elongated and oriented to form the pile-like structure. This is clearly illustrated in FIGURE 14 which is an enlarged cross-section of a thermoplastic polymer layer 58 which is in firm adherence with a fibrous backing material 47 and which has been forced through an opening in a plate 59. As the polymer is removed from the cavity, the neck restriction in the plate 59 forms a pile structure 60 and the polymer is oriented in the direction of removal.

A variety of deformation devices can be used in this invention, such as a porous metal plate formed from sintered metal powder, for example, bronze, aluminum or copper powder. A deformation device of sintered metal fibers, a porous plastic plate or a porous glass plate can also be used.

Any stiff fabric may be used as the deformation device by forcing the polymer through the fabric and then cooling the polymer and removing the fabric from the thermoplastic polymer layer to form pile structures on the polymer layer.

Other deformation devices include such items as a metal wire screen; a composite structure consisting of a top layer of a coarse wire screen and a lower layer of a fine wire screen; a perforated metal sheet; composite of a perforated metal sheet and a woven wire cloth; a composite of a perforated metal sheet and a porous sintered metal plate, or a plate having holes either cylindrical or conical in shape in which the sides of these holes are roughened causing the polymer to adhere as it is being removed.

To aid the removal of the thermoplastic polymer material from the deformation device, a non-stick substance such as polytetrafluoroethylene can be used to coat the device.

(E) Modifications to the process.—Various modifications can be used in the process of this invention to form the novel pile-surfaced product. For example, instead of using a stripping mandrel, the deformation device and the thermoplastic material each can be moved at a different speed, thereby causing pile structures to be formed as the thermoplastic material is displaced from the deforming device.

(F) Product description.—The novel flexible sheet material of this invention is comprised of a flexible substrate that has firmly adhered thereto a multiplicity of pile structures which form the pile surface layer. The individual pile structures are generally aligned in the same direction and have a density of about 5000 to $2 \times 10^6$ piles per square inch and a length of about 0.05 to 2 inches. The pile structures are formed from a thermoplastic polymer and have a tapered base which is firmly adhered to the substrate but the pile structure does not penetrate the substrate. The pile structures are further characterized by being uniaxially oriented, the degree of orientation being such that the pile structure will shrink at least 50–90% of its original length, preferably 80–90% of its original length when heated to the Vicat softening temperature of the thermoplastic polymer. The Vicat softening temperature is determined according to ASTM D–1525–58T.

Figure 11:
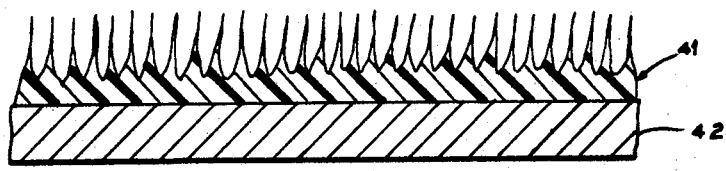
FIGURES 11 and 12 illustrate cross-sections of preferred novel sheet materials having a pile surface formed by the process of this invention.

FIGURE 11 illustrates one preferred embodiment of this invention in which an oriented pile structure is an integral part of the thermoplastic substrate layer 41. This layer 41 preferably is reinforced with a flexible backing 42 such as a woven or non-woven sheet material. Layer 41 with the pile structures may be used with or without the backing material.

Figure 12:
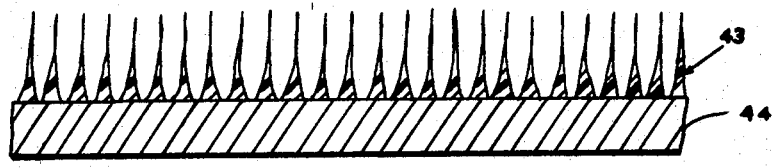

FIGURE 12 illustrates another preferred embodiment of this invention in which the entire thermoplastic layer has been converted into an oriented pile structure in which each pile structure is in firm adherence to the substrate 44 which preferably is a flexible woven or non-woven sheet material.

A variety of thermoplastic polymers are useful in the novel product of this invention to form the oriented pile structure of the surface layer. The following are some of the preferred thermoplastic polymers that are useful in this invention: branched or linear polyethylene, polypropylene, plasticized polyvinyl chloride, rigid polyvinyl chloride, styrene/acrylonitrile copolymers, polycarbonates, polyamides, polyacrylonitrile, cellulose acetate, cellulose butyrate, phenoxy polymers, polyurethanes, acrylic polymer, such as polymethyl methacrylate, methyl methacrylate/ethel acrylate copolymers; acetal resins, vinyl acetate copolymers, such as polymers of ethylene/vinyl acetate; ABS resins, i.e., terpolymers of acrylonitrile/butadiene/styrene; fluorocarbon resins, such as polytetrafluoroethylene and fluorinated ethylene/propylene polymer; polysulfones and the like. Instead of using the thermoplastic polymer, a textile fabric which has been treated or impregnated with a solution of any of the aforementioned thermoplastic polymers can be used to form a novel sheet material of this invention having a pile surfaced layer.

The flexible back to which the thermoplastic pile layer is adhered can be a flexible film but preferably is woven or non-woven fibrous sheet material. Typical examples of woven materials are: woven twills, drills and ducks; jersey, tricot and knitted materials. Non-woven materials can be used, for example, felts, and needle punched porous batt. The choice of the particular fibers from which the substrate is made is not critical and can be made from polyamides, polyesters, polyester/amides, acrylic polymers, viscose rayon, wool, cotton, glass or mixtures thereof.

To give desired physical properties to the final product, the following fillers can be blended with the thermoplastic polymer in amounts up to 65% by volume of polymer: cellulosic materials, such as wood chips; fibers, such as rayon, cotton, flock, sisal and jute; carbon black graphite; asbestos; silica; quartz; glass fillers, such as fiber glass or glass flake; talc; mica; metal oxides, such as titanium dioxide, alumina; fluorocarbon plastics, such as tetrafluoroethylene; calcium carbonate; or metal powders, such as copper, aluminum or bronze. Ultraviolet light absorbers, such as 2-hydroxybenzophenone or phenyl salicylate can also be added to improve the product's resistance to sunlight.

(G) Uses for the product.—The novel product of this invention can be used for a variety of purposes depending on the type of polymer used to form the pile surface layer and the type of backing material used. The following are some typical uses: acoustical materials, advertising novelties, aprons, door panels, headliners for automobiles, upholstery for automobiles and for the home, backing fabrics for plastics, bandages, bed spreads, bibs, book covers, bowling towels, brushes, camouflage cloth, capes, card table covers, carpets, casket liners, chamois cloth, insulation for clothing, comforters, party costumes, coveralls, curtains, decontamination clothing, diapers, diaper liners, dish cloths, doilies, doll clothes, drapes, dresses, dust cloths, fruit and produce pads, garment bags, and the like.

In particular, the novel product of this invention can be used for the following: shoe uppers in which the shoes have a suede-like surface; raincoats (the pile surface can be made of a polymer such as polyethylene which is permeable to air but is permanently water-proof); disposable garments in which the pile surface layer is attached to a porous paper substrate, and which have better aesthetics than all-paper garments.

The following examples illustrate the novel product and the novel process for making the product of this invention.

EXAMPLE 1

With reference to FIGURE 13, a pile surface material is continuously prepared by continuously feeding a composite of a 5 mil thick film of polyethylene, and a woven cotton cloth used as a backing material that has a thread count of about 40–44 threads per inch and weight of about 0.18 pound per square yard, from roller 45. This composite is fed into the heating zone with the polyethylene film facing the infrared heaters. The polyethylene film is heated to about 150° C. in the heating area, which is sufficient to melt the polymer. The composite molten polyethylene film and cotton cloth backing material are fed into the nip of rollers 53 and 54. A nip pressure of about 20 pounds per lineal inch is used. Roller 54 is a porous bronze roller having about 10,000 openings per square inch, each opening having a restricted neck portion with a larger cavity beneath. The molten polymer is forced through the neck restriction and expands in the cavity below. The composite of molten polyethylene film firmly adhered to the backing fabric is then cooled by a stream of cool air blown from conduit 57 which reduces the temperature of the composite to about 70° C. The composite sheet material is stripped from the porous bronze roller by the stripping mandrel 55 which pulls the polyethylene film from the cavities of the porous bronze roller thereby forming pile structures. Cool air is continuously blown from conduit 61 into the nip of the stripping mandrel and the roller 54 to insure that the polymer remains at the aforementioned temperature. The finished pile-surfaced material is wound around the pick-up roller 56.

The resulting product has a pile density of about 10,000 piles per square inch, a pile length of about ¼ inch and an average pile diameter of about 1–2 mils and has a degree of orientation (shrinkage) of about 90% when heated to the Vicat softening temperature of polyethylene. The novel product has excellent aesthetics and can be used for wearing apparel.

EXAMPLE 2

The following polymers are made into a pile-surfaced sheet material by using the same cotton backing material and the same procedure as in Example 1, except that temperature and pressure conditions are used as indicated in Table I. The resulting product in each case is a pile-surfaced material having excellent aesthetic properties and having a wide variety of uses in wearing apparel.

TABLE I

| Polymer Film | Film Thickness, Mils | Temperature Porous Roller, °C. | Cooling Temperature, °C. | Pile Structure | | |
|---|---|---|---|---|---|---|
| | | | | Average Length, Inches | Average Width at Base, Mils | Average Diameter, Mils |
| Acrylonitrile/Butadiene/Styrene | 5 | 200 | 110 | 0.3 | 3 | 0.7 |
| Cellulose Butyrate Acetate | 5 | 240 | 130 | 0.5 | 1.4 | 0.8 |
| "Delrin" Acetal Resin (thermoplastic resin formula) (OCH₂)n Polyamide | 14 | 200 | <150 | 0.2 | 6 | 1.5 |
| Phenoxy | 2 | 300 | 150 | 0.15 | 2 | 0.2 |
| Polycarbonate | 5 | 230 | 120 | 0.3 | 1.9 | 0.7 |
| Polyethylene | 5 | 285 | 150 | 0.23 | 5.5 | 0.8 |
| Branched | 4 | 170 | 65 | 0.2 | 1.5 | 0.2 |
| Linear | 4 | 170 | 135 | 0.5 | 2.5 | 0.5 |
| Polyethylene/Vinyl Acetate | 6 | 114 | 72 | 0.3 | 2 | 1.4 |
| Polypropylene | 5 | 187 | 95 | 0.25 | 0.75 | 0.45 |
| Polystyrene/Acrylonitrile | 5–10 | 250 | 125 | 0.4 | 3.5 | 1 |
| Polystyrene | 11 | 176 | <150 | 0.16 | 5 | 3 |
| Polyvinyl Chloride | 4 | 180 | 80 | 0.2 | 2 | 0.4 |
| "Surlyn" Ionomer Resin Described in U.S. Patent 3,264,272 issued Aug. 2, 1966 to R. W. Kees | 5 | 180 | 90 | 0.11 | 6 | 0.9 |

I claim:
1. A sheet material comprising a flexible substrate having firmly adhered thereto a multiplicity of pile structures forming a surface layer, said pile structures having a tapered base and being firmly adhered to said substrate without penetrating said substrate and being generally aligned in the same direction, and being formed of a thermoplastic polymer, said pile structures being characterized by being uniaxially oriented.

2. The sheet material of claim 1 in which the pile structure has an elongated conical shape.

3. The sheet material of claim 1 in which the flexible thermoplastic polymer substrate is in firm adherence with a fibrous sheet material.

4. The sheet material of claim 1 in which the flexible substrate is of the same thermoplastic polymer as said pile structure.

5. The sheet material of claim 4 in which the flexible substrate is a woven fabric.

6. The sheet material of claim 4 in which the flexible substrate is a non-woven fabric.

7. The sheet material of claim 1 in which the pile structures have a density of about 5,000 to $2 \times 10^6$ piles per square inch, the degree of orientation of the pile structures being such that they shrink 50 to 95% of their length when heated to the Vicat softening temperature of the thermoplastic polymer, said Vicat softening temperature being determined according to ASTM D-1525-58T.

8. The sheet material of claim 7 in which the pile structure has an elongated conical shape and a pile length of about 0.05 inch to 2 inches.

9. The sheet material of claim 7 in which the flexible substrate is of the same thermoplastic polymer as the pile structure.

10. The sheet material of claim 7 in which the flexible substrate is in firm adherence with a fibrous sheet material.

11. The sheet material of claim 10 in which the fibrous sheet material which is in adherence with the flexible substrate is a woven fabric.

12. The sheet material of claim 10 in which the fibrous sheet material which is in adherence with the flexible substrate is a non-woven fabric.

13. A process for forming a flexible sheet material having a pile surface, which comprises forming a pile surface by:
 (1) bringing together a thermoplastic polymer layer and a deforming device having a multiplicity of small openings having restricted neck portions,
 (2) applying to the polymer layer and the deforming device pressure sufficient to introduce the polymer into said openings past said restricted neck portions, and
 (3) maintaining the polymer at a temperature below its softening temperature while
 (4) drawing the thermoplastic polymer layer from said deforming device with sufficient force to remove the polymer from said openings and to form uniaxially oriented pile structures.

14. The process of claim 10 in which the thermoplastic polymer layer has a fibrous backing sheet firmly adhered thereto.

15. The process of claim 1 in which the deforming device is a porous sintered metal plate.

No referenced cited.

ROBERT F. WHITE, *Primary Examiner.*

T. J. CARVIS, *Assistant Examiner.*

UNITED STATES PATENT OFFICE

CERTIFICATE OF CORRECTION

Patent No. 3,390,403                                          June 25, 1968

Jan van Tilburg

It is certified that error appears in the above identified patent and that said Letters Patent are hereby corrected as shown below:

Column 1, line 71, "condiitons" should read -- conditions -- Column 2, line 19, "90" should read -- 95 --. Column 4, line 28, "gauge" should read -- gauze --. Column 5, line 31, after "30" insert -- ° --. Column 10, line 20, "10" should read -- 13 --; line 23, "1" should read -- 13 --.

Signed and sealed this 25th day of November 1969.

(SEAL)
Attest:

Edward M. Fletcher, Jr.                                WILLIAM E. SCHUYLER, JR.
Attesting Officer                                                 Commissioner of Patents